US012646532B2

(12) United States Patent
Jimbo et al.

(10) Patent No.: US 12,646,532 B2
(45) Date of Patent: Jun. 2, 2026

(54) MAGNETIC DISK DEVICE HAVING SHROUD AND GUIDE VANE

(71) Applicants:Kabushiki Kaisha Toshiba, Tokyo (JP); Toshiba Electronic Devices & Storage Corporation, Tokyo (JP)

(72) Inventors: Tomohiko Jimbo, Fujisawa (JP); Biswas Debasish, Shiki (JP); Makoto Okamoto, Kodaira (JP); Yasuhiko Kato, Setagaya (JP)

(73) Assignees: Kabushiki Kaisha Toshiba, Tokyo (JP); Toshiba Electronic Devices & Storage Corporation, Tokyo (JP)

( * ) Notice: Subject to any disclaimer, the term of this patent is extended or adjusted under 35 U.S.C. 154(b) by 0 days.

(21) Appl. No.: 18/732,743

(22) Filed: Jun. 4, 2024

(65) Prior Publication Data

US 2025/0095685 A1     Mar. 20, 2025

(30) Foreign Application Priority Data

Sep. 20, 2023    (JP) ................................. 2023-151959

(51) Int. Cl.
G11B 25/04        (2006.01)
G11B 33/14        (2006.01)
(52) U.S. Cl.
CPC .......... G11B 25/043 (2013.01); G11B 33/148 (2013.01)
(58) Field of Classification Search
None
See application file for complete search history.

(56) References Cited

U.S. PATENT DOCUMENTS

| | | | | |
|---|---|---|---|---|
| 5,696,649 A * | 12/1997 | Boutaghou | ........ | G11B 33/1446 |
| | | | | 360/97.16 |
| 5,907,453 A * | 5/1999 | Wood | .................... | G11B 33/142 |
| 6,493,310 B1 * | 12/2002 | Kim | ..................... | G11B 17/047 |
| | | | | 720/611 |
| 8,077,429 B2 * | 12/2011 | Eguchi | .................... | G11B 33/08 |
| | | | | 360/97.14 |
| 2002/0008934 A1 * | 1/2002 | Tadepalli | ............. | G11B 33/148 |
| 2002/0181149 A1 * | 12/2002 | Shimizu | ............. | G11B 33/1446 |
| 2003/0169531 A1 * | 9/2003 | Wang | .................... | G11B 25/043 |
| 2004/0184178 A1 * | 9/2004 | Asano | ................. | G11B 33/148 |
| 2007/0139815 A1 * | 6/2007 | Takamatsu | ............. | G11B 5/012 |
| 2008/0043369 A1 | 2/2008 | Takemori et al. | | |
| 2009/0073606 A1 * | 3/2009 | Sun | ..................... | G11B 5/6005 |
| | | | | 360/97.13 |
| 2010/0134920 A1 * | 6/2010 | Mizumoto | ........... | G11B 33/148 |

(Continued)

FOREIGN PATENT DOCUMENTS

| | | |
|---|---|---|
| JP | 2007-323788 A | 12/2007 |
| JP | 2010-135002 A | 6/2010 |

(Continued)

*Primary Examiner* — William J Klimowicz

(74) *Attorney, Agent, or Firm* — Oblon, McClelland, Maier & Neustadt, L.L.P.

(57) ABSTRACT

A magnetic disk device includes a disk rotatable in a rotation direction and a shroud that at least partially surrounds the disk along an outer edge of the disk with a gap from the outer edge of the disk. A guide vane is connected to the shroud at a downstream side of an airflow generated in the rotation direction. The guide vane has a structure that decelerates an airflow between the guide vane and the disk.

7 Claims, 4 Drawing Sheets

(56)           References Cited

U.S. PATENT DOCUMENTS

| 2010/0142081 | A1  | 6/2010  | Funabashi et al. |
| 2011/0090592 | A1* | 4/2011  | Hendriks ............ G11B 33/148 |
|              |     |         | 360/97.16 |
| 2011/0194212 | A1* | 8/2011  | Lim .................... G11B 5/5569 |
|              |     |         | 360/294 |
| 2014/0111883 | A1  | 4/2014  | Eguchi et al. |

FOREIGN PATENT DOCUMENTS

| JP | 2014-10844 A | 1/2014 |
| WO | WO 2012/169048 A1 | 12/2012 |

* cited by examiner

X-Y CROSS SECTION

MAGNETIC DISK DEVICE HAVING SHROUD AND GUIDE VANE

CROSS-REFERENCE TO RELATED APPLICATIONS

This application is based upon and claims the benefit of priority from Japanese Patent Application No. 2023-151959 filed on Sep. 20, 2023, and the entire contents of which are incorporated herein by reference.

FIELD

Embodiments described herein relate generally to a magnetic disk device.

BACKGROUND

When particles such as dust adhere to disk surfaces rotating at high speed in magnetic disk devices, the disk surfaces are damaged or data read/write errors are caused.

There is therefore a demand for magnetic disks capable of reducing an adhesion amount of particles on disks.

DETAILED DESCRIPTION

Exemplary embodiments of the present invention are disclosed below.

Technical features including configurations and control of the embodiments and modifications described below, and actions, results, and effects brought by the configurations and control are merely examples.

In addition, similar components are included in the multiple embodiments exemplified below. The same components are denoted by the same reference signs; therefore, redundant description thereof will not be given below.

Figure 1:
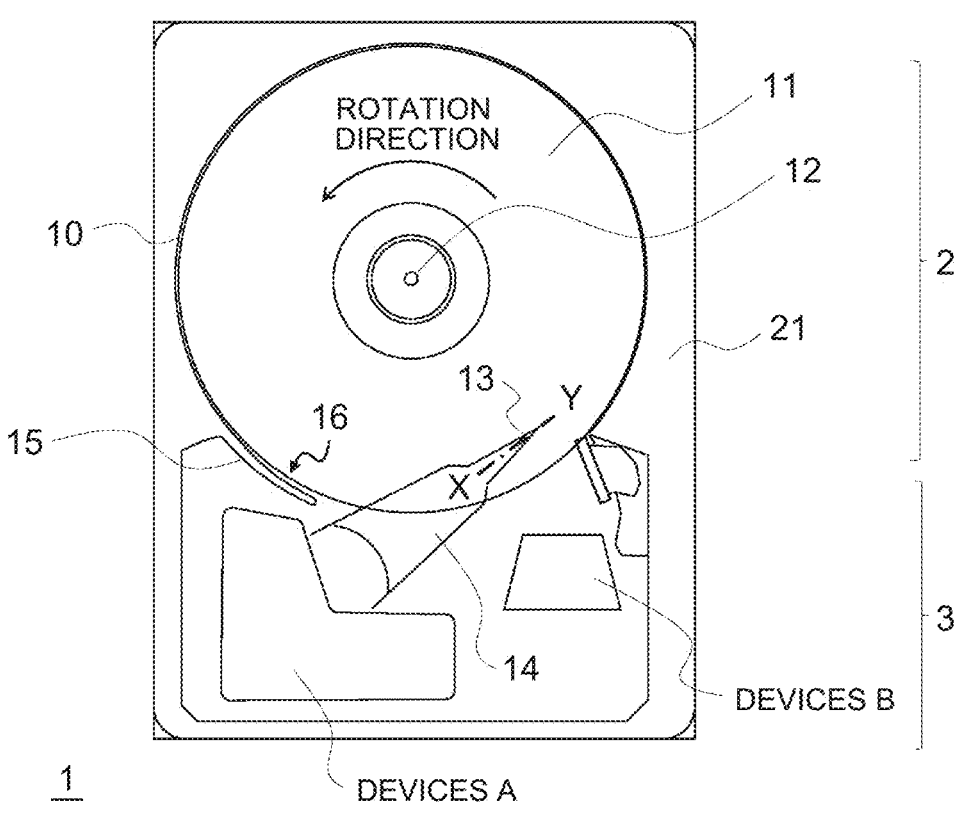
FIG. 1 is an example of a schematic view of a magnetic disk device according to the first embodiment.

As used herein, a direction in which a plurality of disks 11 are stacked may be referred to as a height direction, a direction toward the front side of the paper in FIG. 1 may be referred to as an upward direction, and a direction toward the back side of the paper may be referred to as a downward direction.

First Embodiment

FIG. 1 is an example of a schematic view inside a magnetic disk device in the present embodiment. A magnetic disk device 1 includes a plurality of disks 11, a shroud 10, a magnetic head 13, an arm 14, a guide vane 15, devices such as an actuator, and a casing 21. The casing 21 is divided into a disk side region 2, in which the disk 11, a rotation shaft 12, and the like are housed, and a device side region 3, in which devices such as the magnetic head 13, the arm 14, and the actuator are housed. FIG. 1 exemplifies a state where the disk 11 rotates counterclockwise about the rotation shaft 12, and the magnetic head 13 is located on a surface of the disk 11 to read and write data.

The casing 21 is filled with a medium gas such as air or helium. The casing 21 is capable of sealing the medium gas.

The casing 21 is provided inside with the shroud 10, which at least partially surrounds the disk 11 along an outer edge of the disk 11 with a gap from the outer edge of the disk 11. The casing 21 is also provided inside with the guide vane 15. Gap between the shroud 10 and the disk 11 is, in a region where the shroud 10 extends along the disk 11, preferably 0.1 mm or more and 1.0 mm or less. The shroud 10 is a cover of the disk 11, which at least partially surrounds the disk 11 as illustrated in FIG. 1. The guide vane 15 is a guide member for airflows, and is, for example, a shielding wall.

A plurality of the disks 11, which are recording mediums having disk-shapes, are stacked together. The number of disks 11 can be changed in accordance with specifications. In addition, the disk 11 may have a magnetic layer of a single-sided type or a double-sided type; however, the magnetic layer will be described as a double-sided type in the present embodiment. The plurality of disks 11 are rotatable in a rotation direction by the rotation shaft, and is stacked at predetermined gaps in a rotation shaft direction. As used herein, descriptions may be given on the assumption that a main surface of the disk 11 is "a disk surface", which includes a front surface and a back surface of the disk 11.

The rotation shaft 12 is a rotation shaft that rotates the disk 11. The rotation shaft 12 is connected to a drive motor (not illustrated), and rotates the disk 11, which is fixed to the rotation shaft 12 and disposed so as to be rotationally driven, about the rotation shaft 12 serving as a central axis. Rotation speed of the disk 11 achieved by driving the rotation shaft 12 is typically several thousands rpm to several tens of thousands rpm; however, the rotation speed of the disk 11 in the present embodiment is not limited to this range. The counterclockwise direction in FIG. 1 is described as the rotation direction of the disk 11 in the present embodiment.

Figure 2:
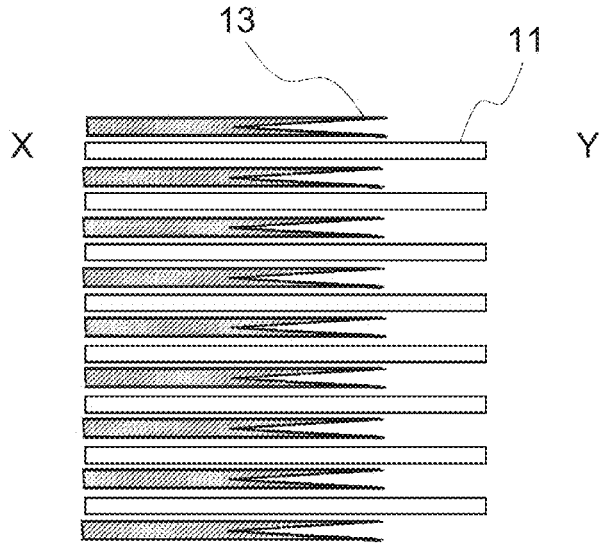
FIG. 2 is a sectional view taken along line X-Y in FIG. 1.
Figure 3:
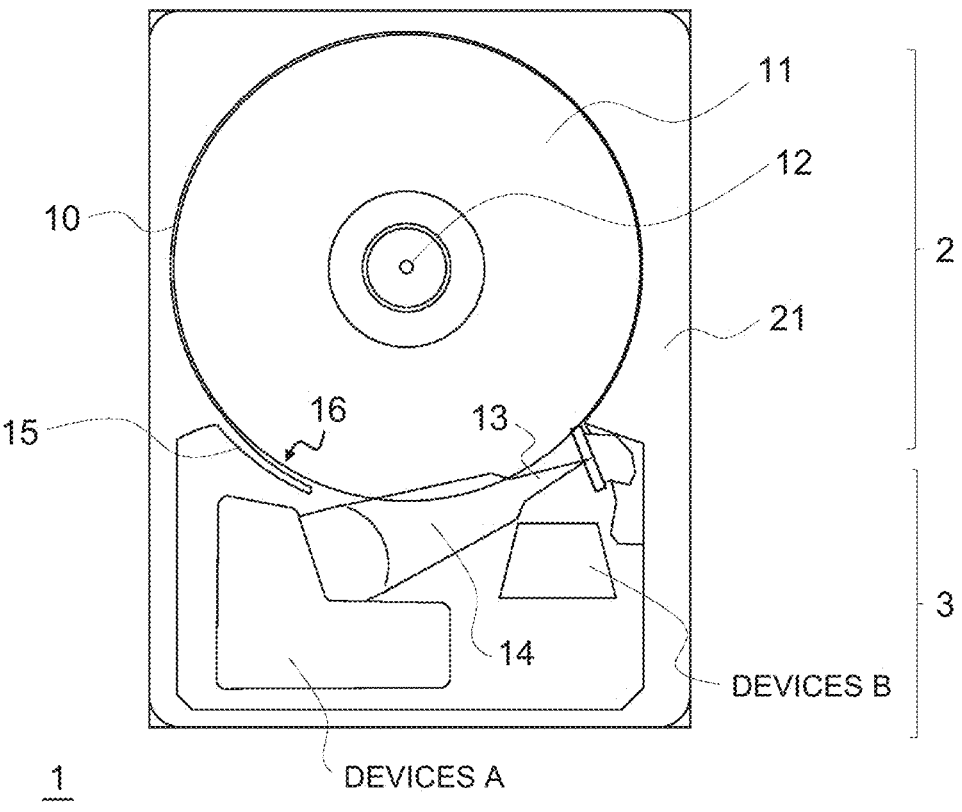
FIG. 3 is an example of a schematic view of the magnetic disk device with disks stopped.

The magnetic head 13 reads data recorded on the disk 11 and writes data to the disk 11. The magnetic head 13 is provided at the distal end of the arm 14. FIG. 2 is a sectional view taken along line X-Y in FIG. 1. The magnetic heads 13 and the disks 11 are alternately arranged. The magnetic head 13 located above the disks 11 is capable of reading and writing (hereinafter, reading/writing) an upper surface (the front surface) of the corresponding disk 11, each magnetic head 13 located between the corresponding disks 11 is capable of reading/writing the lower surface (the back surface) of the corresponding disk 11 located above the magnetic head and reading/writing the front surface of the corresponding disk 11 located below the magnetic head 13, and the magnetic head 13 located below the disks 11 is capable of reading/writing the back surface of the corresponding disk 11 located above the magnetic head 13. FIG. 3 is an example of a schematic view of the magnetic disk device with the disks stopped. When the disk 11 stops from rotating, the magnetic head 13 and the arm 14 stop to retract from the corresponding disk 11, as illustrated in FIG. 3. When the rotation shaft 12 is rotationally driven to rotate the disk 11, each magnetic head 13 floats by a predetermined amount (for example, about 10 nm) from the surface of the corresponding disk 11 due to the airflows generated in the rotation direction of the disk 11 by a centrifugal force and a surface viscosity, has a position of the arm 6 controlled by the actuator, and reads/writes data from/to the portion of the magnetic layer of the disk 11 facing the magnetic head 13. The disks 11 facing the magnetic head 13 corresponds to the disk 11 immediately above the magnetic head 13 and the disk 11 immediately below the magnetic head 13. That is, the magnetic head 13 reads/writes information from/to the opposing disks 11.

The arm 14 is a member that supports the magnetic head 13. Each magnetic head 13, provided at the distal end of the arm 14, is disposed so as to be able to enter the corresponding gap in the stacking direction of the disks 11.

The actuator controls driving of the arm 14 to control the position of the magnetic head 13 with respect to the disk 11. The actuator is included in devices A in FIG. 1. Examples of the actuator include a voice coil motor, a stepping motor, and the like; however, the actuator in the present embodiment is not limited thereto.

Figure 4:
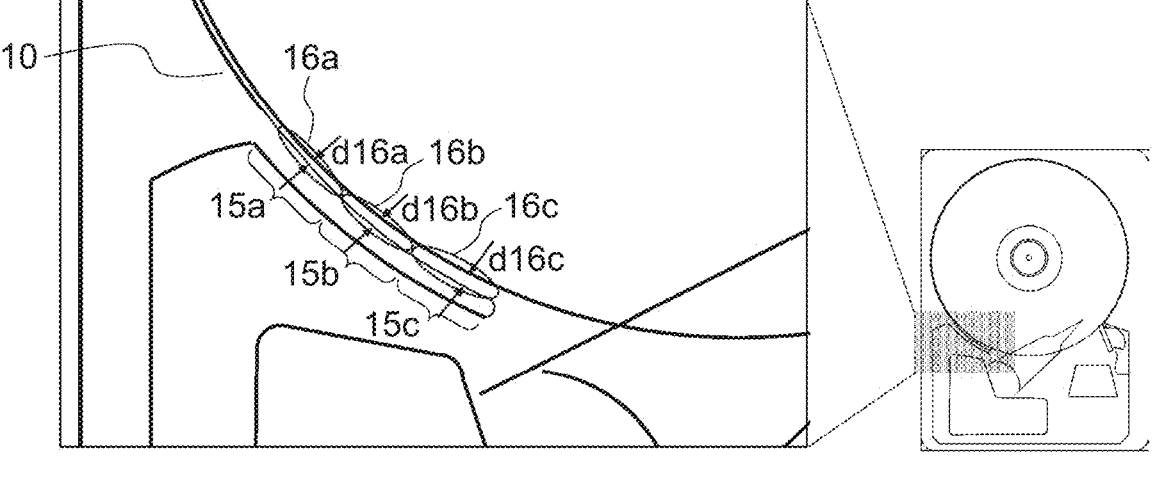
FIG. 4 is an enlarged view of a vicinity of a guide vane of the magnetic disk device in the first embodiment.

The guide vane 15 is provided between the disk side region 2 and the device side region 3. The guide vane 15 is connected to the shroud 10 at the downstream side of the airflows generated in the rotation direction of the disk 11. That is, one end of the guide vane 15 is connected to an end portion of the shroud 10 on the downstream side of the flows in a vicinity of the disk surface of the disk 11. Here, as to the flows flowing in the vicinity of the disk surface of the disk 11 along with the rotation of the disk 11, the vicinity of the flow flowing into the disk side region 2 from the device side region 3 is referred to as "upstream of the flow" (upstream of the flow in the vicinity of the disk surface), and a vicinity of the flow flowing into the device side region 3 from the disk side region 2 is referred to as "downstream of the flow". In addition, the end portion of the shroud 10 indicates both ends of the shroud 10 along the disk 11. The end portion of the shroud 10 exists at two positions, that is, the upstream side and the downstream side of the flows in the vicinity of the disk surface. In addition, "one end of the guide vane 15 is connected to the shroud 10" means that it is only required that at least a portion of the guide vane 15 is in contact with the shroud 10 to have a continuous configuration. Another component or the like may be included between the guide vane 15 and the shroud 10. For example, even if a support member for supporting the guide vane 15 is provided between the guide vane 15 and the shroud 10, it is only required that the shroud 10 to the guide vane 15 is integrally configured, and have a series of configurations capable of guiding a flow 102 and a flow 103 to be described later. The guide vane 15 and the shroud 10 may be made of the same material and be integrally formed, or may be made of different materials. In addition, the other end of the guide vane 15 is located on the downstream side of the flows in the vicinity of the disk 11 than the one end connected to the shroud 10. The guide vane 15 is arranged roughly along the disk 11. Here, it is described as "roughly along the disk 11" because the gap between the guide vane 15 and the disk 11 is not completely constant and varies depending on the position. FIG. 4 is an enlarged view of FIG. 1 of a vicinity of the guide vane 15. The guide vane 15 includes a guide vane connection portion 15a at a portion connected to the shroud, a guide vane distal end portion 15c which is a portion at a distal end on the downstream side of the flows in the vicinity of the disk 11, and a guide vane central portion 15b at an intermediate portion between the guide vane connection portion 15a and the guide vane distal end portion 15c. A region 16 (a gap) is provided between the guide vane 15 and the disk 11. The region 16 includes, depending on the position, a region 16a between the disk 11 and the guide vane connection portion 15a, a region 16b between the disk 11 and the guide vane central portion 15b, and a region 16c between the disk 11 and the guide vane distal end portion 15c.

In the region 16, the shortest distance from a point on a curved surface of the guide vane 15 facing the disk 11 to the disk 11 is defined as a distance d16 between the guide vane 15 and the disk 11. In addition, the shortest distance from a point on the curved surface of the shroud 10 facing the disk 11 to the disk 11 is defined as a distance between the shroud 10 and the disk 11. At this time, d16 is larger than the distance between the shroud 10 and the disk 11. In addition, d16 increases as the distance from the guide vane connection portion 15a increases. That is, when a distance between the guide vane 15 and the disk 11 in the region 16a is denoted by d16a, a distance between the guide vane 15 and the disk 11 in the region 16b is denoted by d16b, and a distance between the guide vane 15 and the disk 11 in the region 16c is denoted by d16c, the guide vane 15 is provided so as to satisfy a relationship of d16a<d16b<d16c. Hereinafter, this structure may be described as "a structure in which d16 gradually increases". In the present embodiment, the maximum value of d16c is preferably 1.0 mm or less, and more preferably 0.8 mm or less.

Figure 5:
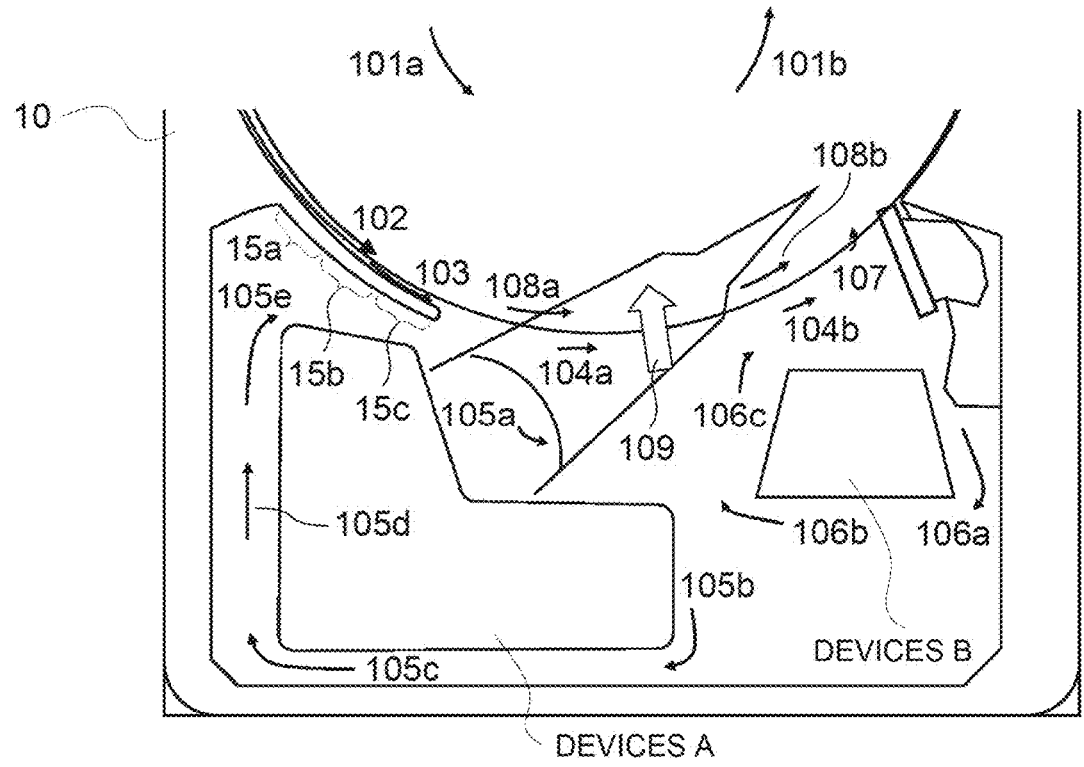
FIG. 5 is a schematic view in which a flow direction is written in an enlarged view of a vicinity of a device side region in the first embodiment.

The airflows generated inside the magnetic disk will be described below. FIG. 5 is a schematic view of the inside of the magnetic disk device of FIG. 1, added with arrows indicating the flows of the airflows. Flows 101a and 101b are flows in the vicinity of the disk surface induced by the disk 11 during rotation of the disk 11. As used herein, the flows 101a and 101b may be collectively referred to as a flow 101. The flow 102 is the flow induced by the rotation of the disk 11, which passes through the gap between the disk 11 and the shroud 10. The flow 103 is a flow that passes through the region 16. A portion of the flow 103 flows in a direction from the disk side region 2 toward the device side region 3 to become flow 104a and flow 104b. A portion of the flow 104a flows in the device side region 3 so as to surround the devices A, including the actuators and the like. These flows are referred to as flows 105a to 105e. A portion of the flow 104b, on the other hand, flows in the device side region 3 so as to surround devices B different from the devices A. These flows are referred to as flows 106a to 106c. A flow 107 is a flow that passes through the device side region 3 and flows into the disk side region 2 again. Flows 108a to 108b are a part of the flow 103 flowing toward the disk side region 2. As used herein, as to the flows flowing in the vicinity of the disk surface of the disk 11 along with the rotation of the disk 11, a vicinity of the flow 107 flowing into the disk side region 2 from the device side region 3 may be referred to as "upstream of the flow", and a vicinity of the flow 103 flowing into the device side region 3 from the disk side region 2 may be referred to as "downstream of the flow". Besides, devices A and devices B may be referred to as device area A and device area B, respectively.

As used herein, the flows 104a to 104b may be collectively referred to as a flow 104, the flows 105a to 105e may be collectively referred to as a flow 105, the flows 106a to 106c may be collectively referred to as a flow 106, and the flows 108a to 108b may be collectively referred to as a flow 108.

It has conventionally been a problem that the flows passing through the device side region 3 flows into the disk side region 2 again, while carrying particles in the device side region 3 having a particle diameter of about several tens of nm to several hundreds of nm. This is because if the particles carried to the disk side region 2 in this manner adhere to the surface of the disk 11, various problems such as damage to the disk surface and data reading/writing errors are caused.

According to the present embodiment, the flows flowing from the disk side region 2 to the device side region 3 is reduced by the guide vane 15, so that the flow rate of the flow 107 that passes through the device side region 3 and flows into the disk side region 2 again can be reduced.

Further, the guide vane 15 in the present embodiment has the distance d16 between the guide vane 15 and the disk 11, which gradually increases from the root to the distal end of the guide vane 15. In the present embodiment, the structure in which the guide vane 15 decelerates the airflows refers to a structure in which d16 of the guide vane 15 gradually increases. In this structure, when applying an equation of continuity to the airflow (the flow 103) between the guide vane 15 and the disk 11, the flow 103 decelerates from the upstream to the downstream. The structure in which the guide vane 15 decelerates the airflows, however, is not limited to this structure, and such a structure is only required to be capable of decelerating the flow 103.

As the flow 103 decelerates, the flow 104 also decelerates. The deceleration of the flow 104a decelerates the flow 105, and the deceleration of the flow 104b decelerates the flow 106. The deceleration of the flow 105 and the flow 106 can reduce the amount of particles carried by the flows while passing through the device side region 3.

In addition, the flow 108 decelerates as the flow 103 decelerates, so that turbulence of the airflows in a vicinity of the boundary between the disk side region 2 and the device side region 3 is also reduced. It is therefore possible to prevent the particles in a vicinity of the outer edge of the disk side region 2 from being caught by the flow 108. In addition, pressure in the disk side region 2 near the device side region 3 increases, which reduces a pressure difference between the disk side region 2 and the device side region 3. The flow 109 from the device side region 3 toward the disk side region 2 induced by this pressure difference can therefore be reduced, so that the flows containing particles can be prevented from flowing into the disk side region 2.

In addition, the deceleration and reduction of the turbulence of the flow 104a and the flow 108a can, in addition to reducing the amount of particles carried to the disk side region 2, reduce vibration of the arm caused by the airflows. The vibration of the arm 14 supporting the magnetic head 13 is reduced in this manner, so that the actuator can determine the position of the magnetic head 13 with more accuracy, or more easily.

As described above, in the magnetic disk device in the present embodiment, the particles carried from the device side to the disk side can be reduced by providing the guide vane having a predetermined shape. The vibration of the arm caused by the airflows can also be reduced.

The casing 21 and the shroud 10 may be integrally formed, and may be integrally manufactured in the manufacturing process. Similarly, the guide vane 15 and the shroud 10 may be integrally formed, and may be integrally manufactured in the manufacturing process.

Second Embodiment

The second embodiment partially modified from the first embodiment will be described with reference to FIG. 6. In the description of the present embodiment, the same parts as those illustrated in the first embodiment are denoted by the same reference signs; therefore, the description thereof will not be given.

Figure 6:
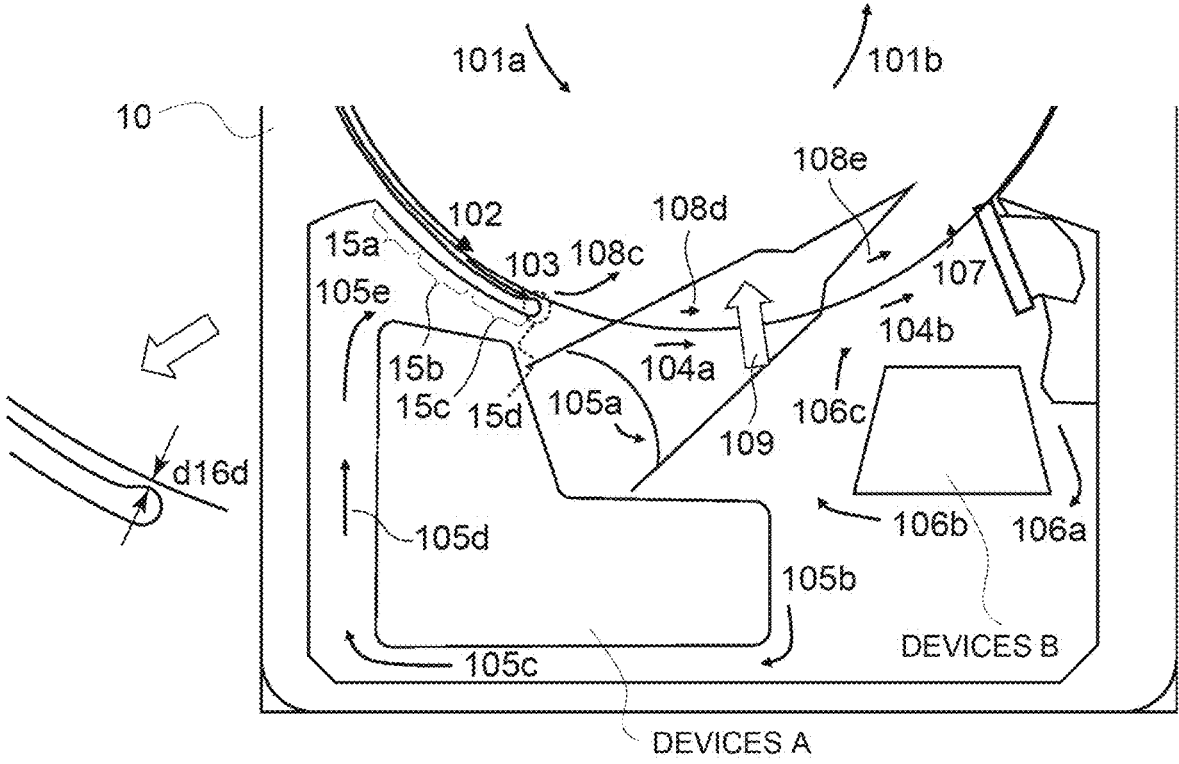
FIG. 6 is a schematic view in which a flow direction is written in an enlarged view of a vicinity of a device side region in the second embodiment.

FIG. 6 is an example of an enlarged view of a magnetic disk device in the present embodiment. In the present embodiment, a guide vane 15 has an airflow guide portion 15d on the further downstream side of a flow 103 of a guide vane distal end portion 15c. The airflow guide portion 15d is, for example, a throttle portion. In the present embodiment, the region of the guide vane 15 on the downstream side of the flow 103, excluding the airflow guide portion 15d, is described as the guide vane distal end portion 15c. As in the first embodiment, a relationship of d16a<d16b<d16c is also established in the present embodiment. The airflow guide portion 15d however faces disks 11, and d16d is thus smaller than the maximum value of d16c when a distance between the airflow guide portion 15d and the disk 11 is defined as d16d. In addition, d16d is preferably 50% or more of the maximum value of d16c, and more preferably 80% or more of the maximum value of d16c. Note that d16d is larger than d16a.

Airflows generated inside the magnetic disk in the present embodiment will be described below. Flows 108c, 108d, and 108e are a part of the flow 103 that flows toward a disk side region 2.

As in the first embodiment, a distance d16 between the guide vane 15 and the disk 11 in the present embodiment satisfies d16a<d16b, so that the flow 103 decelerates. Note that d16d is designed to be at least 50% or more of the maximum value of d16c, and is preferably designed to be 80% or more of the maximum value of d16c, so that excessive re-acceleration of the flow 103 can be prevented. This structure enables the guide vane 15 to guide the direction of the flows which are a part of the flow 103 flowing out of a region 16, while reducing the re-acceleration of the flow 103. The presence of the airflow guide portion 15d therefore does not hinder an effect of decelerating the flow 103 by the guide vane 15.

According to the present embodiment, the flow 103 decelerates due to d16a<d16b, and the airflow guide portion 15d provided at the tip of the guide vane distal end portion 15c also faces the disk side region 2, so that a portion of the flow 103 is guided as a flow 108c that flows closer toward the center of the disk side region 2. This divides the flow 103 into the "flow 108c" and the "flows 108d and 108e of the disk outer edge portion". As a result, the flow 108d and the flow 108e, respectively, have smaller flow rates than that of the flow 108a and the flow 108b. It is therefore possible to further prevent particles in a vicinity of an outer edge of the disk side region 2 from being caught by the flow 108d and the flow 108e. In addition, flow rates of a flow 104a and a flow 104b also decrease, so that the deceleration of the flow 104a decelerates a flow 105, and the deceleration of the flow 104b decelerates the flow 106. The deceleration of the flow 105 and the flow 106 can reduce the amount of particles carried by the flows while passing through the device side region 3. Further, pressure in the disk side region 2 near the device side region 3 increases, which reduces a pressure difference between the disk side region 2 and the device side region 3. This can reduce the flow 109 from the device side region 3 toward the disk side region 2 induced by this pressure difference, so that the flows containing particles can be further prevented from flowing into the disk side region 2.

Figure 7:
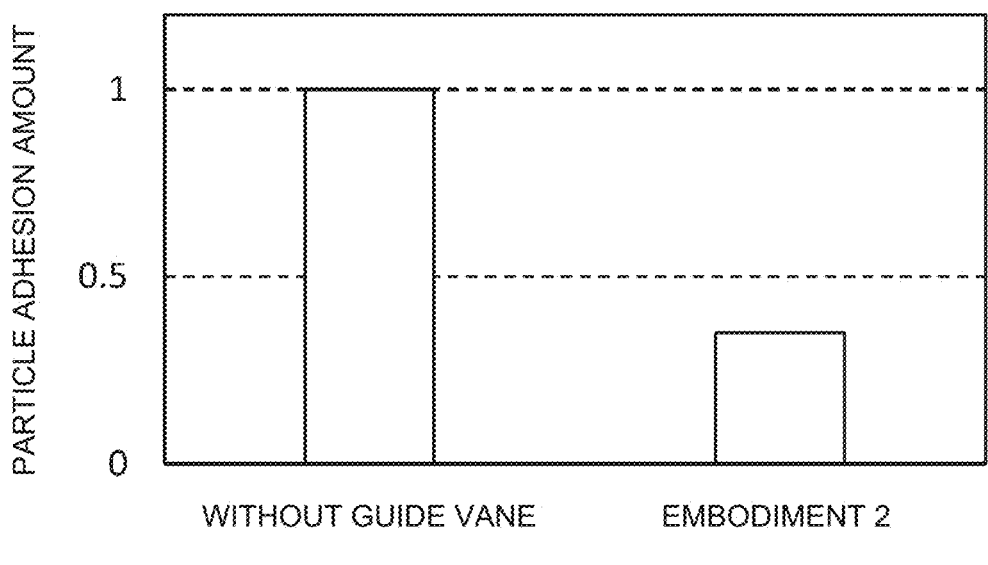
FIG. 7 is a graph comparing an adhesion amount of particles on disk surfaces.

FIG. 7 shows the amount of particles attached to surfaces of the disks 11 when the disks 11 rotate for a certain period of time. FIG. 7 shows a measurement result with respect to an adhesion amount of particles when a magnetic disk device without a guide vane operates for the same period of time. The measurement result in the magnetic disk device without the guide vane is denoted as "without guide vane" and the measurement result of the magnetic disk device with the guide vane 15 according to the present embodiment is denoted as "Embodiment 2" on the horizontal axis of the graph in FIG. 7. According to the results, the adhesion amount of particles to the disks 11 in the magnetic disk device with the guide vane 15 according to the present embodiment was half or less of the adhesion amount of particles to the disks 11 in the magnetic disk device without the guide vane. This is because the guide vane 15 decreases flow rates of the flows flowing into the device side region 3 from the disk side region 2, the flow 103 decelerates due to d16 being larger than the distance between the shroud 10 and the disk 11, the structure in which d16 gradually increases in the region 16 further decelerates the flow 103, and the airflow guide portion 15d guides a portion of the flow 103 closer toward the center of the disk side region 2. It can therefore be seen that the guide vane 15 according to the present embodiment is capable of reducing the particles carried from the device side region 3 to the disk side region 2.

In addition, the deceleration and reduction of turbulence of the flow 104a and the flow 108d can, in addition to reducing the amount of particles carried to the disk side region 2, reduce vibration of arms caused by the airflows. The vibration of the arm 14 supporting the magnetic head 13 is reduced in this manner, so that the actuator can determine the position of the magnetic head 13 with further more accuracy, or further more easily.

As described above, the particles carried from the device side region 3 to the disk side region 2 can be reduced by providing the guide vane having a predetermined shape in the magnetic disk device in the present embodiment. The vibration of the arm 14 caused by the airflows can also be further reduced.

Third Embodiment

The third embodiment will be described below. In the description of the present embodiment, the same parts as those illustrated in the first embodiment and the second embodiment are denoted by the same reference signs; therefore, the description thereof will not be given.

Figure 8:
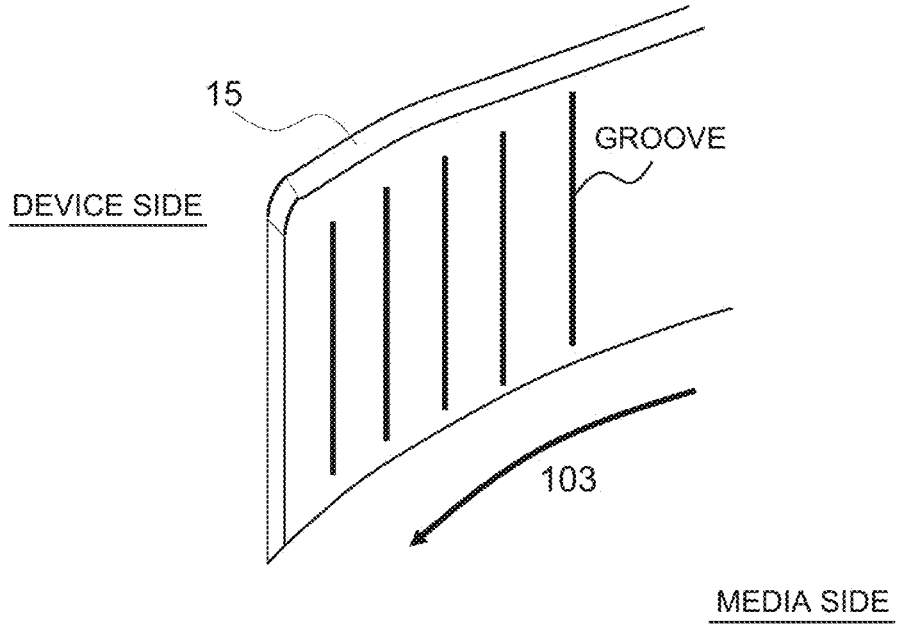
FIG. 8 is an example of an enlarged view of a guide vane in the third embodiment.

In the present embodiment, a guide vane 15 has a surface which is a rough surface having fine unevenness, grooves, or protrusions. In the present embodiment, the guide vane 15 decelerates airflows through the rough surface of the guide vane 15, which is the surface having fine unevenness, grooves, or protrusions. The structure in which the guide vane 15 decelerates the airflows, however, is not limited to this structure, and such a structure is only required to be capable of decelerating the flow 103. Unevenness may also be referred to as roughness, irregularities, and so forth. The fine unevenness, grooves, or protrusions on the surface of the guide vane 15 increase friction received by the flow 103 when passing through a region 16, so that the flow 103 decelerates from the upstream to the downstream. FIG. 8 is an example of the guide vane 15 having grooves on the surface. The grooves are formed on the surface of the guide vane 15 facing disks 11, in FIG. 8. The grooves in FIG. 8 are arranged substantially parallel to a traveling direction of the flow 103; however, shapes and intervals of the grooves provided on the guide vane 15 are not particularly limited.

As described above, particles carried from a device side region 3 to a disk side region 2 can be reduced by effectively decelerating the flow 103. The vibration of the arm 14 caused by the airflows can also be further reduced.

The fine unevenness, grooves, or protrusions in the present embodiment, however, are very small as compared with d16, so that the influence on the size of d16 is almost negligible.

Note that the configuration according to the present embodiment may be used in combination with the first embodiment and the second embodiment.

Multiple embodiments according to the present invention have been described herein; however, these embodiments are presented as examples and are not intended to limit the scope of the invention. In addition, the configurations according to the first embodiment to the third embodiment exemplified herein may be used in any combination. The embodiments of the present invention can be implemented in various other forms, and various omissions, substitutions, and changes can be made without departing from the scope of the invention. These embodiments and modifications thereof are included in the scope and gist of the invention, and are also included in the invention described in the claims and the equivalent scope thereof.

Supplementary Note 1

A magnetic disk device including:
a disk rotatable in a rotation direction;
a shroud that at least partially surrounds the disk along an outer edge of the disk with a gap from the outer edge of the disk; and
a guide vane connected to the shroud at a downstream side of an airflow generated in the rotation direction, wherein
the guide vane has a structure that decelerates an airflow between the guide vane and the disk.

Claim 2

The magnetic disk device according to supplementary note 1, in which
a distance between the guide vane and the disk is larger than a distance between the shroud and the disk.

Supplementary Note 3

The magnetic disk device according to supplementary note 1 or 2, in which
the guide vane includes:
a guide vane connection portion connected to the shroud;
a guide vane distal end portion which is a portion at a distal end on a downstream side of the flow; and
a guide vane central portion between the guide vane connection portion and the guide vane distal end portion, and
a distance between the guide vane central portion and the disk is larger than a distance between the guide vane connection portion and the disk.

Supplementary Note 4

The magnetic disk device according to any one of supplementary notes 1 to 3, in which
the guide vane includes:
a guide vane connection portion connected to the shroud;

a guide vane distal end portion which is a portion at a distal end on a downstream side of the flow; and a guide vane central portion between the guide vane connection portion and the guide vane distal end portion, and a distance between the guide vane central portion and the disk is larger than a distance between the guide vane connection portion and the disk, and a distance between the guide vane distal end portion and the disk is larger than the distance between the guide vane central portion and the disk.

Supplementary Note 5

The magnetic disk device according to any one of supplementary notes 1 to 4, in which
the guide vane includes:
a guide vane connection portion connected to the shroud;
a guide vane distal end portion which is a portion at a distal end on a downstream side of the flow;
a guide vane central portion located between the guide vane connection portion and the guide vane distal end portion; and
an airflow guide portion located on the further downstream side of the flow of the guide vane distal end portion, and
a distance between the guide vane central portion and the disk is larger than a distance between the guide vane connection portion and the disk, and a distance between the airflow guide portion and the disk is smaller than a distance between the guide vane distal end portion and the disk.

Supplementary Note 6

The magnetic disk device according to any one of supplementary notes 1 to 5, in which
the guide vane has unevenness, grooves, or protrusions on a surface.

Supplementary Note 7

A magnetic disk device including:
a disk provided to be rotationally driven by a rotation shaft;
a shroud that partially surrounds the disk along an outer edge of the disk with an interval from the outer edge of the disk; and
a guide vane having one end connected to an end portion of the shroud;
in which
a distance between the guide vane and the disk is larger than a distance between the shroud and the disk.

Supplementary Note 8

The magnetic disk device according to any one of supplementary notes 1 to 7, including:
a casing;
a magnetic head that reads data recorded on the disk and writes data to the disk;
an arm having the magnetic head at a distal end; and
an actuator that controls a position of the magnetic head;
in which
the casing internally includes the disk, the shroud, the guide vane, the magnetic head, the arm, and the actuator.

What is claimed is:

1. A magnetic disk device comprising:
a disk rotatable in a rotation direction;
a shroud that at least partially surrounds the disk along an outer edge of the disk with a gap from the outer edge of the disk; and
a guide vane connected to the shroud at a downstream side of a gas flow generated in the rotation direction, wherein
the guide vane has a structure that decelerates the gas flow between the guide vane and the disk,
the guide vane is formed along the outer edge of the disk, the guide vane is concave on a disk side and has no inflection point, and includes:
a guide vane connection portion connected to the shroud;
a guide vane distal end portion which is a portion at a distal end on a downstream side of the gas flow; and
a guide vane central portion between the guide vane connection portion and the guide vane distal end portion, and
a distance between the guide vane central portion and the disk is larger than a distance between the guide vane connection portion and the disk, and a distance between the guide vane distal end portion and the disk is larger than the distance between the guide vane central portion and the disk.

2. The magnetic disk device according to claim 1, further comprising:
a gas flow guide portion located on the further downstream side of the gas flow of the guide vane distal end portion, and
a distance between the gas flow guide portion and the disk is smaller than a distance between the guide vane distal end portion and the disk.

3. The magnetic disk device according to claim 1, wherein
the guide vane has unevenness, grooves, or protrusions on a surface.

4. The magnetic disk device according to claim 1, further comprising:
a casing;
a magnetic head that reads data recorded on the disk and writes data to the disk;
an arm having the magnetic head at a distal end; and
an actuator that controls a position of the magnetic head, wherein
the casing internally includes the disk, the shroud, the guide vane, the magnetic head, the arm, and the actuator.

5. The magnetic disk device according to claim 1, wherein
the gas flow is a flow of air or helium.

6. A magnetic disk device comprising:
a disk rotatable in a rotation direction;
a shroud that at least partially surrounds the disk along an outer edge of the disk with a gap from the outer edge of the disk; and
a guide vane connected to the shroud at a downstream side of a gas flow generated in the rotation direction, wherein
the guide vane has a structure that decelerates the gas flow between the guide vane and the disk,
the guide vane includes:
a guide vane connection portion connected to the shroud;
a guide vane distal end portion which is a portion at a distal end on a downstream side of the gas flow;

a guide vane central portion between the guide vane connection portion and the guide vane distal end portion; and a gas flow guide portion located on the further downstream side of the gas flow of the guide vane distal end portion, a distance between the guide vane central portion and the disk is larger than a distance between the guide vane connection portion and the disk, and a distance between the guide vane distal end portion and the disk is larger than the distance between the guide vane central portion and the disk, and a distance between the gas flow guide portion and the disk is smaller than the distance between the guide vane distal end portion and the disk.

7. The magnetic disk device according to claim 6, further comprising:

a casing;

a magnetic head that reads data recorded on the disk and writes data to the disk;

an arm having the magnetic head at a distal end; and an actuator that controls a position of the magnetic head, wherein the casing internally includes the disk, the shroud, the guide vane, the magnetic head, the arm, and the actuator.

\* \* \* \* \*